United States Patent [19]

Roy

[11] Patent Number: 5,233,019

[45] Date of Patent: Aug. 3, 1993

[54] SULFONIMIDATES AND METHOD FOR PREPARING SAME

[75] Inventor: Aroop K. Roy, Midland, Mich.

[73] Assignee: Dow Corning Corporation, Midland, Mich.

[21] Appl. No.: 744,202

[22] Filed: Aug. 12, 1991

[51] Int. Cl.$^5$ .................... C08G 75/30; C08G 75/32
[52] U.S. Cl. ................................ 528/391; 564/101
[58] Field of Search ................... 528/391; 564/101

[56] References Cited

U.S. PATENT DOCUMENTS 5,068,379  11/1991  Roy ...................................... 549/214

OTHER PUBLICATIONS

Levchenko et al. in Zh. Obshc. Khim. 32-2585 (1962).
Organic Chemistry 44-13, 2055-2061 (Jun. 22, 1979).

*Primary Examiner*—John C. Bleutge
*Assistant Examiner*—Helen F. Lee
*Attorney, Agent, or Firm*—Robert Spector

[57] ABSTRACT

This invention provides novel organosulfonimidates and a method for preparing both the present sulfonimidates and those disclosed in the prior art. Some of the sulfonimidates can be condensed under relatively mild conditions to form polyorganooxothiazenes.

4 Claims, No Drawings

SULFONIMIDATES AND METHOD FOR PREPARING SAME

BACKGROUND OF THE INVENTION

1. Field of the Invention

This invention relates to a class of compounds of hexavalent sulfur referred to as sulfonimidates. More particularly, this invention relates to a group of novel sulfonimidates wherein the carbon atom bonded to sulfur is other than a cyclic carbon atom of an aromatic hydrocarbon radical. This invention also relates to a method for preparing both the novel sulfonimidates of this invention and prior art sulfonimidates using the corresponding N-triorganosilyl sulfonimidate as a precursor. Some of the sulfonimidates can be converted to useful thermally stable and solvent resistant polymers referred to as polyorganooxothiazenes.

2. Description of the Prior Art

Levchenko et al. in Zh. Obsch. Khim. 32, 2585 (1962) describe the preparation of phenyl esters of areneiminosulfonic acids represented by the general formula $ArS(O)(=NH)OC_6H_5$ where Ar represents a phenyl radical. Esters of iminosulfonic acids have also been referred to as sulfonimidates. Levchenko et al. also report that heating one of the esters they prepared yielded a tarry material that was characterized only by a softening temperature of 80° to 100° C.

Carl Johnson in the Journal of Organic Chemistry, 44, 13 (2055-2061), published on Jun. 22, 1979, reports obtaining a polymer from the reaction of a sulfonimidoyl chloride corresponding to the formula $PhSCl(O)=NH$, where Ph represents a phenyl radical, with pyridine, methylamine or dimethylamine. The article does not describe the isolation of the polymer nor does it provide any structural or other characterization data obtained from the polymer.

The compounds used to prepare the polymers reported in the aforementioned articles by Levchenko et al. and Johnson were, in turn, synthesized from compounds wherein sulfur is in the tetravalent state. Many tetravalent sulfur compounds used in the synthesis of sulfonimidates suffer from one or more of the following disadvantages: they are difficult to synthesize and/or purify, are not readily accessible or available, malodorous, and have limited shelf life due to decomposition during long-term storage. In addition, some of the reactants used to convert the sulfur in these compounds from the tetravalent to the hexavalent state suffer from some of the same disadvantages as the compounds they are intended to convert. Moreover, some of these reactants are high energy compounds, and potentially explosive.

U.S. patent application Ser. No. 07/644,761, filed in the name of the present inventor and Gary Burns on Jan. 23, 1991 teaches the preparation of N-triorganosilylsulfonimidates from hexavalent sulfur compounds such as sulfonic acids and their derivatives, including the chlorides, anhydrides and amides. Most of the final compounds and intermediates are generally very stable, readily available, and can be handled in large quantities without exercising more than the ordinary precautions involved in handling acidic and corrosive materials.

Heating the silylated sulfonimidates converts them to polyorganooxothiazenes containing repeating units represented by the general formula $-N=S(O)(R^1)-$, where $R^1$ represents an unsubstituted or substituted hydrocarbon radical. This thermally induced condensation reaction requires prolonged heating, typically at temperatures in the range from 100° to 160° C. for periods of about 140 hours, sometimes in the presence of a polymerization catalyst. The yields of polymer reported in the examples of the patent application range from 39 to 83 percent, with only one instance of a 97 percent yield using a tungsten compound as the catalyst.

One objective of this invention is to provide precursors, some of which are novel, that will yield polyorganooxothiazenes in higher yield using lower temperatures and shorter polymerization times than reported in the aforementioned patent application.

SUMMARY OF THE INVENTION

This invention provides novel organosulfonimidates wherein the carbon atom bonded to sulfur is other than a cyclic carbon atom of an aromatic hydrocarbon radical. Both the organosulfonimidates of this invention and those described in the prior art can be prepared by the method of this invention, which involves heating certain N-triorganosilylsulfonimidates in the presence of an excess relative to the stoichiometric amount of an alcohol or phenol required for the reaction. Some of the sulfonimidates prepared using the present method, particularly those containing a phenoxy or a fluorinated alkoxy group bonded to sulfur, can be converted to the corresponding polyorganooxothiazene using milder conditions and shorter reaction times than are reported using the corresponding N-triorganosilylsulfonimidates.

DETAILED DESCRIPTION OF THE INVENTION

The organosulfonimidates of this invention correspond to the formula $HN=S(O)(R^{1*})OR^4$, where $R^4$ represents an unsubstituted or substituted monovalent hydrocarbon radical and $R^{1*}$ is selected from the group consisting of unsubstituted and substituted monovalent hydrocarbon radicals, with the proviso that the carbon atom of $R^{1*}$ that is bonded to sulfur is not one of the cyclic carbon atoms of an aromatic hydrocarbon radical, and heterocyclic radicals wherein the hetero atom is oxygen, sulfur or tertiary nitrogen and the acyclic sulfur atom of the sulfonimidate is bonded to a cyclic carbon atom of the heterocyclic radical or separated from the heterocyclic ring by at least one carbon atom or a combination of carbon and hetero atoms.

This invention also provides a method for preparing organosulfonimidates comprising the sequential steps of 1) maintaining a reaction mixture comprising an N-triorganosilyl organosulfonimidate of the formula $R^2_3SiN=S(O)(R^1)OR^4$ and a stoichiometric excess of an alcohol $R^5OH$ under conditions sufficient to desilylate said N-triorganosilyl sulfonimidate, and
2) isolating the resultant desilylated organosulfonimidate, where $R^1$ is selected from the group consisting of unsubstituted and substituted monovalent hydrocarbon radicals and heterocyclic radicals wherein the hetero atom is selected from the group consisting of oxygen, sulfur and tertiary nitrogen and the acyclic sulfur atom of said organosulfonimidate is bonded to a cyclic carbon atom of the heterocyclic radical or is separated from the heterocyclic ring by at least one carbon atom or a combination of carbon and hetero atoms, and $R^2$, $R^4$ and $R^5$ are individually selected from the group consisting of unsubstituted and substituted monovalent hydrocarbon radicals.

This invention also provides a method for preparing an organooxothiazene polymer, said process comprising heating at least one organosulfonimidate of this invention where $R^4$ of the preceding formula for the sulfonimidates represents phenyl or fluoroalkyl to form the corresponding organooxothiazene polymer and then isolating said polymer.

When any of the hydrocarbon radicals represented by $R^1$, $R^{1*}$, $R^2$ and $R^4$ in the formula for the sulfonimidates prepared in accordance with the present method and their precursors contain substituents, the only limitation on the substituent is that it not interfere with the synthesis of the organosulfonimidates or any subsequent conversion of sulfonimidates to organooxothiazene polymers. Substituents precluded by this definition include those with labile hydrogen atoms, including hydroxyl, amino, mercapto and carboxyl. Enolizable substituents such as hydrocarbonyl [RC(O)—] should also be avoided.

Suitable substituents for $R^1$, $R^{1*}$, $R^2$ and $R^4$ include but are not limited to alkoxy, aryloxy, nitro, dihydrocarbylamino, halogen and carboalkoxy.

In addition to unsubstituted and substituted monovalent hydrocarbon radicals, $R^1$ can represent a saturated or unsaturated heterocyclic ring structure wherein the hetero atom is oxygen, sulfur or tertiary nitrogen and the heterocyclic ring is bonded to sulfur through at least one carbon atom. Representative ring systems include but are not limited to thiophene, pyridine and furan, with the sulfur atom of the polymer backbone being bonded to a cylic carbon atom of the heterocyclic radical. In another embodiment, $R^1$ represents a heterocyclic ring structure that is separated from the sulfur atom of the organosulfonimidate by one or more carbon atoms, or a combination of carbon and hetero atoms such as nitrogen and oxygen.

The hydrocarbon radicals represented by $R^1$, $R^{1*}$, $R^2$ and $R^4$ typically contain from 1 to about 20 carbon atoms.

The reactants and the sequence of reactions used in accordance with the present method and the preparation of these reactants will now be discussed in detail.

A method for preparing N-triorganosilyl organosulfonimidates is described in this inventor's previous patent application Ser. No. 07/644,761 and in the accompanying examples. This method involves the following series of steps:

1) preparing N-triorganosilyl organosulfonamide corresponding to the formula $R^1SO_2N(H)_n(SiR^2_3)_{(2-n)}$ where n is 0 or 1 by reacting either an organosulfonyl chloride of the formula $R^1SO_2Cl$ or an organosulfonic anhydride of the formula $(R^1SO_2)_2O$ with a hexaorganodisilazane of the formula $(R^2_3Si)_2NH$, where $R^1$ and $R^2$ are as defined in the preceding portion of this specification;

2) reacting the resultant silylated organosulfonamide with a triorganodihalophosphorane of the formula $R^3_3PX_2$ where $R^3$ represents an aryl radical and X is chlorine or bromine to form the corresponding organosulfonimidoyl halide of the formula $R^2_3SiN=S(O)(R^1)X$; and 3) reacting the organosulfonimidoyl halide with an alcohol or phenol of the formula $R^4OH$ in the presence of an acid acceptor to form the corresponding N-triorganosilyl organosulfonimidate represented by the formula $R^2_3SiN=S(O)(R^1)OR^4$, where $R^4$ represents an unsubstituted or substituted monovalent hydrocarbon radical.

N,N-bis(triorganosilyl)sulfonamides can also be prepared by reacting an organosulfonamide of the formula $R^1SO_2NH_2$ with a triorganochlorosilane of the formula $R^2_3SiCl$ in the presence of an acid acceptor.

Preparation of the N-Mono- and N,N-Bis(triorganosily organosulfonamide)

N-triorganosilyl organosulfonamides (3) or N,N,-bis(-triorganosilyl) organosulfonamides (5) are prepared by reacting 1) the chloride (1), anhydride (2) or amide (4) of an organosulfonic acid containing the same carbon-bonded organic group on sulfur as desired in the final organosulfonimidate with 2) a hexaorganodisilazane or the combination of triorganochlorosilane with triethylamine or other suitable tertiary amine to react with the hydrogen chloride generated as a by-product of the reaction. These reactions are depicted in the following equations 1, 2 and 3.

Eq. 1  $R^1SO_2Cl$[or $(R^1SO_2)_2O$] +
      1    2

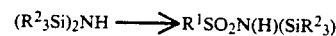

3

Eq. 2  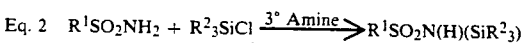

4                         3

Eq. 3  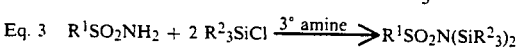

4                         5

$R^1$ is preferably alkyl containing from 1 to 20 carbon atoms, halogenated alkyl, aryl, halogenated aryl, aralkyl or aralkenyl. Particularly preferred embodiments of $R^1$ include but are not limited to methyl, ethyl, 3-chloropropyl, phenyl, p-fluorophenyl and beta-styryl (PhCH=CH— where Ph is phenyl). $R^2$ is preferably alkyl containing from 1 to 4 carbon atoms, based on the availability of the intermediates used to prepare these organosilicon compounds.

The monosilylated organosulfonamide (3) is converted to the corresponding organosulfonimidoyl halide (7) by reacting it with a triorganodihalophosphorane, $R^3_3PX_2$ (6) in the presence of a tertiary amine as an acid acceptor as shown in equation 4. The corresponding disilylated organosulfonamide (5) is converted to organosulfonimidoyl halide (7) by reaction with the phosphorane (6) as shown in equation 5. In place of the acid acceptor an additional equivalent of alcohol and acid acceptor are used in the next step to convert the chlorosilane generated as a by-product of the reaction to the more inert alkoxysilane.

Eq. 4  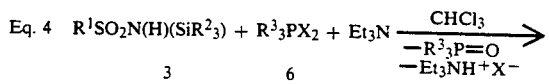

3        6

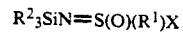

7

Eq. 5  $R^1SO_2N(SiR^2_3)_2 + R^3_3PX_2 \xrightarrow[\substack{-R^2_3SiX \\ -R^3_3P=O}]{\substack{CH_2Cl_2 \text{ or} \\ CHCl_3}}$ $R^2_3SiN=S(O)(R^1)X$

7

The triorganodichlorophosphorane can be prepared as shown in equation 6 by reacting a triorganophosphine, $R^3_3P$, with hexachloroethane, $C_2Cl_6$, or with elemental bromine to yield the corresponding dibromophosphorane. To ensure a complete reaction the mixture of phosphine and hexachloroethane should be heated for at least 4 hours.

Eq. 6  $R^3_3P + C_2Cl_6 \xrightarrow[-C_2Cl_4]{CHCl_3} R^3_3PCl_2$

Reaction of the organosulfonimidoyl halide (7) with a alcohol or phenol $R^4OH$ in the presence of a tertiary amine or other acid acceptor converts it to the corresponding organosulfonimidate (8). The reaction is depicted in equation 7. $R^4$ can be any monovalent unsubstituted or substituted hydrocarbon radical. When it is desired to convert the organosulfonimidate to a polyorganooxothiazene, $R^4$ should be an electron-withdrawing group such as phenyl or a fluoroalkyl radical such as 2,2,2-trifluoroethyl.

Eq. 7  $R^2_3SiN=S(O)(R^1)X + R^4OH \xrightarrow{Et_3N}$

7

$R^2_3SiN=S(O)(R^1)OR^4$

8

Desilylation of the N-triorganosilyl organosulfonimidate (8), by reaction with a stoichiometric excess of a substituted or unsubstituted aromatic or aliphatic alcohol $R^5OH$ to form a desilylated organosulfonimidate (9), is shown in Eq. 8. $R^5$ represents an unsubstituted or substituted monovalent hydrocarbon radical. $R^5$ is preferably lower alkyl containing from 1 to 4 carbon atoms, most preferably methyl, based on the higher basicity of these alcohols relative to others. The rate of the desilylation reaction is believed to be directly related to the basic character of the alcohol reactant.

The present inventor discovered that the minimum amount of alcohol required to achieve substantially complete desilylation is dependent upon the radicals represented by $R^1$ and $R^4$. Using methanol as the alcohol, when $R^4$ is phenyl, the stoichiometric excess of alcohol varies from 100 percent when $R^1$ is methyl to 200 percent when $R^1$ is phenyl. When $R^4$ is a fluorinated alkyl radical, a 500% excess of methanol is required.

When $R^4$ represents an alkyl radical, a catalytic amount of potassium fluoride is typically required to achieve a useful rate for the desilylation reaction.

Eq. 8  $R^2_3SiN=S(O)(R^1)OR^4 + R^5OH \xrightarrow[-R^5OSiR^2_3]{HEAT}$

8

$HN=S(O)(R^1)OR^4$

9

Preparation of mixtures of desilylated organosulfonimidates (12) and (13) containing different $R^1$ groups by desilylation of mixtures of N-triorganosilyl organosulfonimidates (10) and (11) using a stoichiometric excess of the alcohol $R^5OH$ is shown in Eq. 9. No side reactions were found to occur during this desilylation. When $R^4$ in at least one of the mixed silylated organosulfonimidates represents an alkyl radical, a catalytic amount of potassium fluoride is typically required to achieve desilylation at a useful rate.

Eq. 9  $R^2_3SiN=S(O)(CH_3)OR^4 + R^2_3SiN=S(O)(Ph)OR^4 +$ 10                            11

Excess $R^5OH \longrightarrow R^5OSiR^2_3 + HN=S(O)(CH_3)OR^4 +$

12

$HN=S(O)(Ph)OR^4$ [Ph = phenyl]

13

The yield of desilylated organosulfonimidate is in most cases at least 95% using reaction temperatures below 50° C. and at reaction times of not more than 5 hours. Reaction temperatures in the range of from 0° to about 50° C. are preferred for the preparation of those sulfonimidates where $R^4$ represents an aromatic or fluorinated aliphatic hydrocarbon radical. These sulfonimidates can be condensed to form polyoxothiazenes as described elsewhere in this specification. The use of a large excess of alcohol $R^5OH$ and the lowest reaction temperature are particularly desirable when $R^4$ represents an aromatic hydrocarbon radical. Sulfonimidates that do not condense to form polyorganooxothiazenes can be prepared at temperatures of up to about 100° C.

The desilylation reaction is preferably conducted under anhydrous conditions and preferably under an inert atmosphere such as nitrogen to avoid reactions of the $-OR^4$ group bonded to sulfur. A non-reactive diluent can be included in the reaction mixture.

Properties of Desilylated Organosulfonimidates

Desilylated organosulfonimidates wherein $R^4$ represents an alkyl or substituted alkyl radical are typically clear, viscous liquids, whereas desilylated organosulfonimidates wherein $R^4$ represents phenyl or other aromatic hydrocarbon radical are typically crystalline solids.

The desilylated sulfonimidates of this invention are stable for at least five to seven days when stored at $-20°$ to $-25°$ C. When stored at room temperature, partial condensation to the corresponding polyorganooxothiazene can occur over time periods as short as 16 hours.

The desilylated organosulfonimidates can be characterized by $^1H$ NMR and $^{13}C$ NMR spectroscopy.

Preparation of Polyorganooxothiazene and Organooxothiazene Copolymers

The thermally initiated condensation of preferred desilylated organosulfonimidates (8) where $R^4$ represents phenyl or fluorinated alkyl to the corresponding polyorganooxothiazene (14) is shown in equation 10.

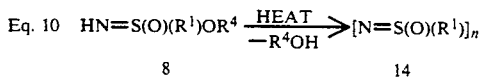

Eq. 10  $HN=S(O)(R^1)OR^4 \xrightarrow[-R^4OH]{HEAT} [N=S(O)(R^1)]_n$ 8  14

Yields from condensation of the desilylated organosulfonimidates are nearly stoichiometric, reaction time is equal to or less than two hours and reaction temperatures, in most cases, do not exceed 120° C.

The present inventor discovered that organosulfonimidates wherein $R^4$ is not a strongly electron-withdrawing group such as aryl or fluoroalkyl do not undergo a heat-induced condensation to form the corresponding polyorganooxothiazene. For example, when $R^4$ is ethyl prolonged heating of these non-condensable compounds appears to result in partial rearrangement to the corresponding sulfonamide.

The aforementioned article by Levchenko et al. reports that phenyl benzenesulfonimidate condenses nearly quantitatively at 200° or 250° C. By contrast, the present inventor has discovered that a nearly quantitative condensation of the same compound occurs even at temperatures of 85° to about 120° C.

Thermogravimetric analyses under helium atmosphere (10° C./min heating rate) performed by the present inventor indicated that, irrespective of the $R^1$ group, polyorganooxothiazenes prepared from either N-triorganosilyl organosulfonimidates, as described in the present inventors U.S. patent application Ser. No. 07/644,761 or the desilylated organosulfonimidates described in the present specification exhibit an onset of decomposition at 240°-260° C.

Mixtures of two or more preferred desilylated organosulfonimidates containing different $R^1$ substituents can be copolymerized as shown in equation 11, where Ph represents a phenyl radical. Copolymer properties are determined by the relative proportion and attributes of the $R^1$ groups incorporated into the copolymer.

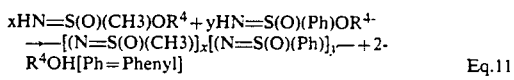

$xHN=S(O)(CH3)OR^4 + yHN=S(O)(Ph)OR^4$
$\rightarrow [(N=S(O)(CH3)]_x[(N=S(O)(Ph)]_y - + 2-$
$R^4OH[Ph=Phenyl]$   Eq.11

The repeating units in preferred copolymers contain $R^1$ substituents that are alkyl, halogenated alkyl or phenyl, where the halogen is fluorine, chlorine or bromine. The alkyl and halogenated alkyl radicals preferably contain from 1 to 20 carbon atoms. Copolymers wherein $R^1$ is methyl, phenyl or p-fluorophenyl are particularly preferred.

The preparation of preferred organosulfonimidates and the subsequent thermal condensation reaction to form the corresponding polyorganooxothiazene can be carried out in the same reactor when the reactor is equipped with the capability to strip the excess alcohol reactant and alkoxysilane by-product of the desilylation reaction, the alcohol produced as a by-product of the condensation reaction and any reaction solvents present.

Polyorganooxothiazenes can be characterized using conventional analytical methods, including gel permeation chromatography, differential scanning calorimetry, thermogravimetric analysis and nuclear magnetic resonance.

Properties of Polyorganooxothiazenes

The polyorganooxothiazenes are clear, glassy solids at room temperature. The degree of polymerization of the polymers is preferably from 100 to 5,000, and the polymers are particularly useful as solvent-resistant molding and coating materials.

Polyorganooxothiazenes containing an alkyl radical such as methyl bonded to sulfur are soluble in water at temperatures above about 60° C. and insoluble in liquid aliphatic, aromatic and chlorinated hydrocarbons, ethers and nitriles.

Polymers containing an aromatic radical such as phenyl bonded to sulfur are insoluble in both hot and cold water and in liquid aliphatic hydrocarbons.

A variety of chemically reactive polymers can be prepared by replacing the hydrogen or halogen atoms on the substituent identified in the preceding formulae as $R^1$ and $R^{1*}$ with reactive groups such as amino, hydroxyl and carboxyl.

Sulfonimidates wherein $R^4$ is not sufficiently electron-withdrawing for conversion to polyorganooxothiazenes are useful as intermediates for preparing compounds of hexavalent sulfur.

EXAMPLES

The following examples describe the preparation of representative organosulfonimidates using the present method and the condensation of preferred sulfonimidates to polyorganooxothiazenes. The examples should not be interpreted as limiting the scope of the invention defined in the accompanying claims. Unless otherwise indicated, all parts and percentages in the examples are by weight.

The parenthetical numbers immediately following names of compounds refer to the same classes of intermediates and products as the equations contained in the preceding section of this specification.

Preparation of N,N-bis(trimethylsilyl) Methanesulfonamide (5a)

A glass reactor equipped with a stirrer, nitrogen inlet, reflux condenser and addition funnel was purged with nitrogen and charged with 29.1 g (0.30 mol) of methanesulfonamide, $MeSO_2NH_2$, where Me represents the methyl radical, 84.9 ml (0.605 mol) of triethylamine and 240 ml of dry benzene. Trimethylchlorosilane (129.5 ml, 1.00 mol) was then added through the addition funnel over a period of 15 minutes to the stirred mixture, followed by heating at the boiling point for three hours. The mixture was then diluted with 200 ml of hexane and stirring was continued for 30 minutes.

The solid salt which precipitated during the reaction was washed three times with a total of about 250 ml. of hexane and the washings were combined with the liquid portion of the reaction mixture. The solvents together with unreacted silane and amine were removed from this liquid by distillation using reduced pressure at a temperature of from 45° to 55° C. The light brown liquid that remained was distilled twice using a 10 cm Vigreaux column to yield 36.9 (51% yield) of a colorless liquid that boiled between 100° and 106° C. under a pressure of 5.2 mm Hg.

The reaction product was found to contain 5% of the corresponding N-trimethylsilyl methanesulfonamide.

Preparation of N-trimethylsilyl Methanesulfonamide
(3a, R=Me)

A glass reactor equipped with a water-cooled reflux condenser, a stirrer and a nitrogen inlet was purged with nitrogen and charged with hexamethyldisilazane (88.8 ml, 0.4123 mole), and methanesulfonyl chloride (32.2 ml, 0.4082 mole). The mixture was then heated to a temperature between 90° and 100° C. until initiation of the reaction. The mixture was then heated to between 115° and 120° C. for two hours to maintain refluxing of liquid, at which time it was allowed to cool to room temperature. The trimethylchlorosilane produced as a by-product of the reaction was then removed under reduced pressure.

The crude monosilylsulfonamide (3a), was greater than 98 percent pure, and was either used as such or further purified by distillation. The $^1$H nuclear magnetic resonance (NMR) spectrum of the crude product as a 20-25 percent solution in chloroform using a frequency of 90 MHz. exhibited the following shifts: 0.10 (s, 9H); 2.8 (s, 3H); 5.25 (s, 1H, NH).

Preparation of N-Trimethylsilyl Benzenesulfonamide
(3b, R=Phenyl)

A glass reactor equipped with a reflux condenser, addition funnel and mechanically operated stirrer was purged with nitrogen and charged with benzenesulfonamide (48.12 g., 0.300 mol), triethylamine (44.6 ml, 0.315 mol) and 230 ml of dry benzene. Trimethylchlorosilane (38.8 ml, 0.300 mol) was added through the addition funnel to the mixtrure over 15-20 minutes. The addition funnel was then rinsed with 10 ml of benzene and the mixture heated at the boiling point for three hours.

After cooling to room temperature the mixture was filtered under nitrogen and the solid which had precipitated in the reactor was isolated, washed three times with benzene, and the washings combined with liquid portion of the mixture. The liquid was then heated at 45°-55° C. under reduced pressure for a period of time sufficient to remove the solvent and excess amine. The residue, a semi-solid, was distilled under a pressure of 0.05 mm Hg. The amount of product obtained was equivalent to a 91% yield of the desired N-trimethylsilyl benzene sulfonamide (3b). The $^1$H NMR spectrum of the product (90 MHz, 20-25% in $CH_2Cl_2$) exhibited maxima at the following shift values: 0.18 (s, 9H); 5.25 (s, 1H, NH, using chloroform as the solvent), 7.38-7.61 (m, 3H), 7.75-7.91 (m, 2H).

Preparation of N-Trimethylsilyl 2-Phenylethylenesulfonamide (3d)

A glass reactor equipped with a mechanically operated stirrer, reflux condenser and gas inlet was charged with 2-phenylethylenesulfonyl chloride (0.2464 mol, 53.6 ml) and hexamethyldisilaznane (0.2488 mol, 53.6 ml), following which the contents of the reactor were heated. The generation of trimethylchlorosilane became evident at a temperature of 107°-110° C., and the mixture was heated for one hour at a temperature of 115°-117° C. Volatile materials were removed by heating to a temperature of from 45° to 55° C. under reduced pressure to yield a thick, reddish colored material. This material was distilled twice to yield 42.7 g of N-trimethylsilyl 2-phenylethylenesulfonamide. The product was collected at 155°-160° C. at a pressure of 0.05 mm. Hg. Analysis by $^1$H NMR indicated that the product was 95% pure. The NMR spectrum obtained using a 20-25% solution of the product in acetonitrile and an RF value of 90 MHz exhibited signals corresponding to the following chemical shifts: 0.33 (s, 9H), 5.50 (s, 1H, NH), 7.08 (d, 1H), and 7.40-7.80 (m, 6H).

Preparation of N-trimethylsilyl 3-Chloropropanesulfonamide (3e)

A glass reactor equipped with a stirrer, reflux condenser and gas inlet was charged with hexamethyldisilazane (0.4235 mol, 91.2 ml) and 3-chloropropanesulfonyl chloride (0.4193 mol, 75.0 g). The contents of the reactor were heated. A refluxing liquid was first observed at a temperature of 85°-95° C., and the mixture became clear. The mixture became cloudy at a temperature of about 105 degrees. The temperature of the mixture was maintained at 120° C. for 90 minutes and at 145°-150° C. for 15 minutes. The mixture was then allowed to cool to room temperature, at which time it was filtered, the solids were washed with benzene, and the washing liquid combined with the liquid portion of the mixture. The combined liquids were then heated at 60°-65° C. under reduced pressure to remove volatile materials and then distilled. The fraction boiling from 127°-129° C. under a pressure of from 0.04-0.07 mm. Hg was collected, and was equivalent to a 72.5% yield based on initial reactants. The $^1$H NMR spectrum was consistent with the expected product.

General Procedure for Preparation of N-Trimethylsilylalkane- and N-Trimethylsilylarenesulfonimidoyl Chlorides (7) from the Corresponding N-Trimethylsilylsulfonamides (3)

A glass reactor equipped with a stirrer, addition funnel and gas inlet was purged with nitrogen and charged with hexachloroethane as a 1 to 2 molar solution in dry chloroform. A solution of triphenylphosphine as a 1 to 2 molar solution in dry chloroform was added to the reactor with stirring over 5 min. while the reactor was cooled to 0° C. The mixture was heated at the boiling point for 4.5 hr and then cooled to 0° C. Triethylamine was then added to the reactor over 5 minutes at a temperature of 0° C. followed by the addition of a 4 to 7 molar solution of a monosilylsulfonamide in dry chloroform over a 10-15 minute period while the reactor was cooled to −78° C. The contents of the reactor were then allowed to warm to 0° C. during which time the mixture became virtually clear. This was interpreted as indicative of the formation of a sulfonimidoyl chloride. The presence of the sulfonimidoyl chloride was inferred from the $^1$H NMR spectrum of the mixture. In some instances this analysis was performed when a clear mixture was first observed.

Because the sulfonimidoyl chlorides are not stable for extended periods above 0° C., they were not isolated. Instead, they were allowed to react immediately with phenol or 2,2,2-trifluoroethanol in the presence of triethylamine as an acid acceptor to form the corresponding sulfonimidates.

N-Trimethylsilylmethanesulfonimidoyl Chloride (7a)

The reactants used in the general procedure were hexachloroethane (0.315 mol, 76.09 g), triphenylphosphine (0.3165 mol, 83.85 g), triethylamine (0.315 mol, 44.6 ml), and N-trimethylsilyl sulfonamide (3a) (0.315 mol, 52.6 g). The $^1$H NMR spectrum (90 MHz, $CHCl_3$ as the solvent) exhibited signals at the following shift values: 0.13 (s, 9H) and 3.45 (s, 3H).

N-Trimethylsilylbenzenesulfonimidoyl Chloride (7b)

The reactants used in the general procedure were hexachloroethane (0.1353 mol, 32.68 g), triphenylphosphine (0.1367 mol, 36.22 g), triethylamine (0.1353 mol, 19.2 ml), and N-trimethylsilyl-sulfonamide (3b) (0.1353 mol, 31.0 g).

N-trimethylsilyl-2-phenylethylenesulfonimidoyl Chloride (N-trimethylsilyl-β-styrenesulfonimidoyl Chloride) (7d)

The reactants used in the foregoing general procedure were hexachloroethane (0.1667 mol, 40.27 g), triphenylphosphine (0.1683 mol, 44.59 g), triethylamine (0.1667 mol, 23.6 ml), and the N-trimethylsilyl sulfonamide (3d) (0.1667 mol, 42.50 g).

N-Trimethylsilyl-3-Chloropropanesulfonimidoyl Chloride (7e)

The reactants used in the foregoing general procedure were hexachloroethane (0.0902 mol, 21.79 g), triphenylphosphine (0.0911 mol, 24.14 g), triethylamine (0.0902 mol, 12.8 mL), N-trimethylsilyl sulfonamide (3e) (0.0902 mol, 20.66 g). The identity of the reaction product was confirmed by the presence of signals at the following shifts in the $^1$H NMR spectrum: 90 MHz (CHCl$_3$): 0.05 (s, 9H), 2.12 (m, 2H, SCH$_2$CH$_2$), 3.38 (t, 2H, SCH$_2$), 3.45 (t, 2H, ClCH$_2$).

General Procedure for the Synthesis of N-trimethylsilylalkane- and N-Trimethylsilyl Arenesulfonimidates (8) from the Corresponding Sulfonimidoyl Chlorides (7)

A mixture of the appropriate alcohol (2,2,2-trifluoroethanol or phenol) and an amount of triethylamine based on 98% yield of sulfonimidoyl chloride dissolved in an amount of dry benzene sufficient to form a 3 to 5 molar solution of the amine or alcohol was added over a 15 to 30 minute period with stirring to a glass reactor containing the sulfonimidoyl chloride dissolved in chloroform from the previous reaction. The reactor was maintained at a temperature of 0° C. during the addition. Following completion of the addition the mixture was stirred at 0°-5° C. for 60-120 minutes then diluted with a quantity of isomeric hexanes equivalent to 20-40% of the volume of chloroform presnet in the mixture and the mixture stirred for about 16 hours at room temperature.

About 70 to 80 percent of the solvents and other volatile materials were then removed under reduced pressure at a temperature of from 40° to 45° C. A quantity of isomeric hexanes sufficient to either provide smooth stirring of the three equivalents of solid by-products or sufficient to form a 0.5-1.0 molar solution of the sulfonimidate, based on theoretical yield, were added. The mixture was stirred for 30-60 minutes, filtered under nitrogen and the solids washed three or four times with hexanes. The washings were combined with the initial filtrate, which was then concentrated at a temperature of from 45° to 55° C. under reduced pressure. This usually resulted in the precipitation of additional solid material. Isomeric hexanes was again added, the mixture stirred 15-30 minutes, filtered under nitrogen, and the solids again washed two or three times with hexanes. Solvents were removed from the combined filtrate and washings at a temperature of from 45° to 55° C. under reduced pressure to yield the crude N-trimethylsilyl organosulfonimidate.

The crude organosulfonimidate was purified by distillation under reduced pressure from one to three times to yield the pure N-trimethylsilyl organosulfonimidate.

2,2,2-Trifluoroethyl-N-trimethylsilyl Methanesulfonimidate (8aa)

The reactants used in the general procedure were sulfonimidoyl chloride (7a), triethylamine (0.3089 mol, 43.8 ml) and 2,2,2-trifluoroethanol (0.3087 mol, 22.5 ml). The boiling range of the sulfonimidate was 77°-78° C./7.7 mm Hg and the yield was 73%. 1H NMR signals (90 MHz, C$_6$H$_6$): 0.30 (s,9H), 2.40 (s,3H), 3.97 (m, 2H, diastereotopic OCH$_2$CF$_3$ protons). Elemental Analysis: Calc. C, 29.14; H, 5.66; N, 5.62; S, 12.86. Found C, 29.01; H, 5.47; N, 5.65; S, 12.96.

Phenyl N-trimethylsilyl Methanesulfonimidate (8ab)

The reactants used in the general procedure were sulfonimidoyl chloride (7a), triethylamine (0.4657 mol, 66.0 ml) and phenol (0.4655 mol, 43.81 g). Boiling range of the product: 73°-78° C./0.03 mm. Yield 53% after three distillations. 1H NMR signals (90 MHz, CH$_2$Cl$_2$): 0.05 (s, 9H), 3.05 (s, 3H), and 7.08-7.51 (m, 5H).

Phenyl N-trimethylsilyl Benzenesulfonimidate (8 bb)

The reactants used in the general procedure were sulfonimidoyl chloride (7 b), triethylamine (0.1328 mol, 18.8 ml), phenol (0.1326 mol, 12.48 g). Boiling range: 110°-121° C./0.05 mm. Yield: 21% $^1$H NMR signals (90 MHz, CH$_2$Cl$_2$): 0.21 (s, 9H), 6.78-7.01, 7.11-7.38 (m, 5H), 7.41-765 (m, 3H), 7.78-8.01 (m, 2H).

2,2,2-Trifluoroethyl N-Trimethylsilyl-2-Phenylethylene-sulfonimidate (8 da)

The reactants used in the general procedure were sulfonimidoyl chloride (7 d), triethylamine (0.1634 mol, 23.2 ml), 2,2,2-trifluoroethanol (0.1633 mol, 11.9 ml). Boiling range of product: 105°-108° C./0.04 mm; Yield: 45%; $^1$H NMR signals (90 MHz, CH$_3$CN): 0.3 (s, 9H), 4.47 (q, 2H, multiplet in benzene), 7.02 (d, 1H), 7.40-7.87 (m, 6H). Elemental Analysis: Calc. C, 46.27; H, 5.38; N, 4.15; S, 9.50. Found C, 46.80; H, 5.42; N, 4.23; S, 10.51.

2,2,2-Trifluoroethyl N-Trimethylsilyl 3-Chloropropane-sulfonimidate (8 ea)

The reactants used in the general procedure were sulfonimidoyl chloride 7 e, triethylamine (0.1444 mol, 20.5 ml), 2,2,2-trifluoroethanol (0.1443 mol, 10.5 ml). Boiling Point: 85°-87° C./1.0 mm. Yield: 67%. $^1$H NMR (90 MHz C$_6$H$_6$); 0.28 (s, 9H), 1.77-2.14 (m, 2H, SCH$_2$CH$_2$), 2.86 (t, 2H, SCH$_2$), 3.17 (t, 2H, ClCH$_2$), 4.04 (m, 2H, OCH$_2$CF$_3$).

Preparation of Desilylated Organosulfonimidates

General Procedure for the Preparation of Desilylated Organosulfonimidates (9) by Desilylation of the Corresponding N-Triorganosilylorganosulfonimidates (8).

A glass reactor equipped with a stirrer, rubber septum and gas inlet was purged with nitrogen and charged with the N-triorganosilyl organosulfonimidate and any desilylation catalyst. The temperature of the reaction mixture was maintained at 15°-25° C. using a waterbath and an amount equivalent to a stoichiometric excess of alcohol was added to the reactor. The mixture was usually stirred for 2 to 5 hours while the temperature was maintained at from 22° to 52° C. The excess alcohol and volatile byproducts were then removed under reduced pressure at temperatures not exceeding 35°-55° C. The ethyl- and 2,2,2-trifluoroethylsulfonimidates were clear, viscous liquids at room temperature. The phenyl sulfonimidates were crystalline solids at room temperature. The desilylated sulfonimidates capable of condensing to form polyoxothiazenes were stored at −20° to −25° C. Thermally induced condensation to the corresponding oxothiazene polymer was usually carried out within 1 to 3 days following preparation of the desilylated sulfonimidate, even though the sulfonimidates are stable for at least 7 days at −20° to −25° C.

Preparation of 2,2,2-trifluoroethyl Methanesulfonimidate (HN=S(O)(CH$_3$)OCH$_2$CF$_3$) Using Methanol Reactants used in the general procedure were 2,2,2-trifluoroethyl N-trimethylsilyl methanesulfonimidate (0.201 mol, 50.0 g) and methanol (1.205 mol, 48.8 ml). Reaction temperature was 45°-47° C.; reaction time was 5 hours. Stripping temperature was less than 55° C. and the product yield at least 96%. The $^1$H NMR spectrum of the product (200 MHz, 30% in CDCl$_3$) exhibited maxima at the following shift values: 3.1 (s,3H); 3.59 (s,broad,1H,NH); 4.40 (q, 2H).

Preparation of 2,2,2-Trifluoroethyl Methanesulfonimidate (HN=S(O)(CH$_3$)OCH$_2$CF$_3$) Using 2,2,2-Trifluoroethanol Reactants used in the general procedure were 2,2,2-trifluoroethyl N-trimethylsilyl methanesulfonimidate (0.025 mol, 6.23 g), 2,2,2-trifluoroethanol (0.0263 mol, 1.9 ml) and potassium fluoride (0.000025 mol, 0.0015 g) was used as a catalyst. Reaction temperature was 22°-25° C.; reaction time was 66 hours. Stripping temperature was less than 55° C.; product yield was 80%, with some condensation to polymer.

Yield of the product under the same reaction conditions but without the use of potassium fluoride as a catalyst was 15-20%.

Preparation of 2,2,2-Trifluoroethyl 3-Chloropropanesulfonimidate {HN=S(O)(CH$_2$CH$_2$CH$_2$Cl)OCH$_2$CF$_3$}

Reactants used in the general procedure were 2,2,2-trifluoroethyl N-trimethylsilyl-3-chloropropanesulfonimidate (0.005 mol, 1.56 g) and methanol (0.03 mol, 1.3 ml). Reaction temperature was 45° C.; reaction time was 5 hours. The temperature at which volatile materials were removed did not exceed 55° C. and product yield was greater than 99%. The $^1$H NMR spectrum of the product (90 MHz, 30% in C$_6$H$_6$) exhibited maxima at the following shift values: 1.96 (m, SCH$_2$CH$_2$CH$_2$Cl); 2.93 (apparent triplet with indication of multiplicity, SCH$_2$); 3.17 (t, ClCH$_2$, $^3J_{HH}$=6.3 Hz); 3.48 (s, broad, 1H, NH); 4.03 (apparent quartet, OCH$_2$CF$_3$, $^3J_{FH}$=8.4 Hz).

Preparation of 2,2,2-Trifluoroethyl 2-Phenylethylenesulfonimidate (HN=S(O)(C$_8$H$_7$)OCH$_2$CF$_3$)

Reactants used in the general procedure were 2,2,2-trifluoroethyl N-trimethylsilyl 2-phenylethylenesulfonimidate (0.01 mol, 3.37 g) and methanol (0.06 mol, 2.5 ml). Reaction temperature was 40°-48° C.; reaction time was 5 hours. Stripping temperature was less than 55° C.; product yield was greater than 99%. The $^1$H NMR spectrum of the product (90 MHz, 20% in CH$_3$CN) exhibited maxima at the following shift values: 4.20-4.67 (apparent quartet, OCH$_2$CF$_3$, $^3J_{FH}$=8.6 Hz; plus, broad NH); 7.1 (d, 1H, SCH=CHC$_6$H$_5$, $^3J_{HH}$=15.6 Hz); 7.4–7.9 (m, 6H, C$_6$H$_5$ and C$_6$H$_5$CH).

Desilylated Phenyl Methanesulfonimidate (HN=S(O)(CH$_3$)OC$_6$H$_5$)

Reactants used in the general procedure were phenyl-N-trimethylsilyl methanesulfonimidate (0.015 mol, 3.65 g) and methanol (0.03 mol, 1.3 ml). Reaction temperature was 22°-25° C.; reaction time was 2 hours. Stripping temperature was less than 35° C.; product yield was greater than 98%. The $^1$H NMR spectrum of the product (90 MHz, 25% in CH$_2$Cl$_2$) exhibited maxima at the following shift values: 3.11 (s, 3H, CH$_3$); 3.48 (s, 1H, broad, NH); 7.11-7.61 (m, 5H, OC$_6$H$_5$).

Desilylated Phenyl Benzenesulfonimidate (HN=S(O)(C$_6$H$_5$)OC$_6$H$_5$)

Reactants used in the general procedure were phenyl N-trimethylsilylbenzenesulfonimidate (0.02 mol, 6.10 g) and methanol (0.06 mol, 2.5 ml). Reaction temperature was 22°-25° C.; reaction time was 4 hours. Stripping temperature was less than 35° C.; product yield was 95%. The $^1$H NMR spectrum of the product (200 MHz, 25% in CDCl$_3$, 1 drop CH$_3$CN) exhibited maxima at the following shift values: 3.78 (s, 1H, broad, NH); 6.88-8.01 (m, 10H, SC$_6$H$_5$, OC$_6$H$_5$).

Desilylated Ethyl Methanesulfonimidate (HN=S(O)(CH$_3$)OC$_2$H$_5$)

Reactants used in the general procedure were ethyl-N-trimethylsilyl methanesulfonimidate (0.02 mol, 3.90 g), methanol (0.120 mol, 4.9 ml) and potassium fluoride (0.0001 mol, 0.0058 g). Reaction temperature was 51°-52° C.; reaction time was 5 hours. Stripping temperature was 45° C.; product yield was >99%. The product was a clear, colorless liquid. Yield of the product under the same reaction conditions but without the use of potassium fluoride catalyst was 60%.

The yield of the organosulfonimidate under the same reaction conditions, but without the use of potassium fluoride and increasing the amount of methanol (0.220 mol, 9.0 ml), was 80%. $^1$H NMR spectrum of the product (90 MHz, 25% in CH$_2$Cl$_2$) exhibited maxima at the following shift values: 1.21(t,3H, OCH$_2$CH$_3$, $^3J_{HH}$=7.2 Hz), 2.88 (s, 3H, SCH$_3$), 3.11 (s, 1H, broad, NH), 4.02 (apparent quartet, 2H, OCH$_2$CH$_3$).

General Procedure for the Preparation of Polyorganooxothiazenes By Thermal Condensation of Desilylated Sulfonimidates A glass reaction vessel equipped with a stirrer and gas inlet was connected to a condensation trap held at −78° C., purged with nitrogen and charged with the desilylated sulfonimidate(s). N,N-Dimethylformamide (anhydrous) was added as a solvent to the reactor to make a 1-3 molar solution of the sulfonimidate when a solution polymerization was performed. The pressure was reduced in order to remove the alcohol by-product of the condensation reaction to the −78° C. trap. The vessel was heated to 90°-205° C. for a period of 0.5-3 hours. At the end of the heating period the vessel was cooled to room temperature. In all cases, condensation of the desilylated sulfonimidate was found to be near-quantitative based on the amount of alcohol recovered in the −78° C. trap, or on the basis of NMR analysis of the residue in the reaction vessel.

The crude polymer was isolated by first dissolving it in dimethylformamide as the solvent (except where otherwise noted) to make a 1-4 molar solution and then by precipitating the polymer into excess toluene, 2-propanol or distilled water as the non-solvent. The polymer was then filtered using a 0.5-0.8 micron nylon membrane filter, washed several times with toluene, 2-propanol or water and dried in a vacuum oven at 80°-95° C. for 40-70 hours. Weight average molecular weight ($M_w$), number average molecular weight ($M_n$) and degree of polymerization (DP) of the polymers were obtained by gel permeation chromatography (GPC) in dimethylformamide solution at 0.5% w/v concentration and 90° C. against polystyrene standards using micro Styragel(R) columns on a Waters 150C GPC instrument at a flow rate of 2 ml/min.

Poly(methyloxothiazene)

The reactant used in the general procedure was desilylated 2,2,2-trifluoroethyl methanesulfonimidate (0.200 mol, 35.4 g) and no solvent was used. Reaction conditions: 105°-110° C. for 2 hours under a pressure of 10 mm Hg. The precipitation medium was toluene. Analysis by GPC indicated: $M_w=45,000$; $M_w/M_n=4.5$; DP=584.

Poly(methyloxothiazene)

The reactant used in the general procedure was desilylated phenyl methanesulfonimidate (0.015 mol, 2.56 g) and no polymerization solvent. Reaction conditions: 105° C. for 1.5 hours under atmospheric pressure. The precipitation medium was toluene. Analysis by GPC indicated: $M_w=50,000$; $M_w/M_n=4.1$; DP=649.

Poly(methyloxothiazene)

The reactant used in the general procedure was desilylated phenyl methanesulfonimidate (0.021 mol, 3.63 g) and the polymerization solvent was dimethylformamide. Reaction conditions: 90°-100° C. for 1.25 hours under atmospheric pressure. The precipitation medium was 2-propanol. Analysis by GPC indicated: $M_w=87,000$; $M_w/M_n=3.2$; DP=1130.

Poly(3-chloropropyloxothiazene)

Reactant used in the general procedure was desilylated 2,2,2-trifluoroethyl 3-chloropropanesulfonimidate (0.02 mol, 4.79 g) in the absence of solvent. Reaction conditions: 110°-115° C. for 0.3 hours followed by 100° C. for 1.7 hours, all under a pressure of 6 mm Hg. The precipitation medium was water. Analysis by GPC indicated: $M_w=44,000$; $M_w/M_n=6.9$; DP=315.

Poly(2-phenylethenyloxothiazene) or Poly(beta-styryloxothiazene)

Reactant used in the general procedure was desilylated 2,2,2-trifluoroethyl 2-phenylethylenesulfonimidate (0.01 mol, 2.65 g) in the absence of solvent. Reaction conditions: 115°-120° C. for 0.8 hours under a pressure of 9 mm Hg pressure, followed by 110° C. for 1.8 hours under 0.2 mm Hg pressure. Dichloromethane was substituted for N,N-dimethylformamide of the general procedure as the solvent used to isolate the polymer. The precipitation medium was hexane. Analysis by GPC indicated: $M_w=60,000$; $M_w/M_n=10.1$; DP=363.

Poly(phenyloxothiazene) Prepared at Various Temperatures

Reactant used in the general procedure was desilylated phenyl benzenesulfonimidate (0.012 mol, 2.80 g) in the absence of a polymerization solvent.

Reaction conditions:

100°-105° C. for 2.0 hours under a pressure of 1.3 mm Hg for one hour followed by one hour at 100°-105° C. under a pressure of 0.2 mm Hg. The condensation appeared complete after 20 minutes; The precipitation medium was water. Analysis by GPC indicated a bimodal distribution: $M_w=299,000$, 24,000; $M_w/M_n=1.3$, 1.3; DP=2151, 173. The polymer was white in color 200°-205° C. for 1.0 hour under 1 mm Hg pressure. The condensation appeared complete when the temperature reached 120° C.; reaction pressure was 1 mm Hg. The precipitation medium was water. Analysis by GPC indicated a bimodal distribution: $M_w=332,000$, 32,000; $M_w/M_n=1.3$, 1.2; DP=2388, 230. The polymer was off white in color.

250° C., raised from room temperature over a reaction time period of 0.5 hours; The condensation appeared complete by 125° C.; reaction pressure was 1.2 mm Hg. The precipitation non-solvent was water. Analysis by GPC indicated a bimodal distribution: $M_w=299,000$, 25,000; $M_w/M_n=1.4$, 1.2; DP=2151, 180. The polymer was black in color.

From the molecular weight data for the condensation of desilylated phenyl benzenesulfonimidate to poly(phenyloxothiazene) at these various temperatures it is clear that there is no advantage to raising the condensation temperature of a general desilylated organosulfonimidate condensation procedure to 200° or 250° C. from the more economical and preferred range of 80°-120° C.

Further, during the condensation of desilylated phenyl benzensulfonimidate at 200° and 250° C., small quantities of solid material were seen to have condensed at the necks of the reaction flask, an occurrence not observed during condensations at 90°-120° C. These sublimates were not characterized, however their formation would be consistent with the onset of polymer decomposition as evidenced by thermogravimetric analysis. In addition, while the polymer obtained at 200° C. was off-white in color, the polymer obtained at 250° C. was black, even after purification, indicating polymer decomposition products at the higher temperature.

Poly(methyl-co-phenyloxothiazene)

Reactants used in the general procedure were desilylated phenyl methanesulfonimidate (0.0045 mol) and phenyl benzenesulfonimidate (0.0045 mol). The reactants were obtained as a mixture by desilylating a mixture of phenyl N-trimethylsilyl methanesulfonimidate (0.0045 mol) and phenyl N-trimethylsilylbenzenesulfonimidate (0.0045 mol) according to the general procedure for the preparation of desilylated sulfonimidates heretofore using methanol as the alcohol reactant. The reaction mixture did not contain a solvent. Reaction temperature was 110°-115° C. for one hour at a pressure of 4.5 mm Hg followed by 105°-110° C. for one hour at a pressure of 1 mm Hg; reaction time was 2.0 hours; reaction pressure was 4.5 mm Hg for one hour followed by 1 Hg for one hour. The precipitation non-solvent was water. Analysis by GPC indicated: $M_w=55,000$; $M_w/M_n=3.6$.

Attempted Condensation of Ethyl Methanesulfonimidate

Desilylated ethyl methanesulfonimidate could not be condensed to poly(methyloxothiazene), even in the presence of potassium fluoride as a catalyst. Evidence of partial rearrangement to N-ethylmethanesulfonamide was obtained using $^1$H NMR.

Comparative Examples of the Preparation of Polyorganooxothiazenes by the Thermal Condensation of N-Triorganosilylorganosulfonimidates as Disclosed in U.S. patent application Ser. No. 07/644,761.

General Procedure for Preparation of Poly(methyloxothiazene) by the Thermal Condensation of N-triorganosilylorganosulfonimidates The N-triorganosilyl organosulfonimidate was placed in a pre-weighed, heavy-walled glass ampule using a pipette. The ampule contents were then degassed using a vacuum line by standard freeze-thaw techniques. This procedure was repeated for a total of three times. When a solid polymerization catalyst was used the catalyst was transferred into the ampule under a nitrogen atmosphere prior to addition of the organosulfonimidate. Liquid catalysts were placed in the ampule using a hypodermic syringe following addition of the organosulfonimidate and prior to freezing of the contents of the ampule. In all instances the concentration of catalyst was 0.05 mole percent, based on monomer.

When 2,2,2-trifluoroethyl(N-trimethylsilyl)methanesulfonimidate was used as the monomer, evacuation of the ampule was performed at room temperature under a pressure of 10 mm Hg prior to degassing under full vacuum using the freeze-thaw technique.

The ampule was then sealed with the contents frozen and placed in a metal pipe equipped with screw caps. The pipe was then placed in a thermostatically regulated oven maintained at 120° C. for the time period specified in Table 1. At the end of this period, the pipe was allowed to cool to room temperature. The ampule was taken out, cooled in liquid nitrogen and then opened. The liquid remaining in the ampule was analyzed using $^1$H NMR to determine the amount of monomer that had reacted.

The crude solid polymer in the ampule was washed three times with methylene chloride and then dried under reduced pressure. The polymer was then dissolved in 4 ml of N,N-dimethylformamide and precipitated by dropwise addition of the resultant solution to an excess to toluene. The precipitated polymer was washed first with toluene then with isomeric hexanes and finally dried in a vacuum oven for 24–48 hours at 80°–84° C. The typical product was a flaky or fibrous vanilla-colored solid.

The molecular weight of the solid material was determined in N,N-dimethylformamide using a 0.5% solution at 90° C. using u-Styragel(R) columns having pore sizes of $10^3$, $10^4$, and $10^5$ angstroms and polystyrene standards with a refractive index detector. The values for the weight average molecular weight ($M_w$), the number average molecular weight ($M_n$) and $M_w/M_n$ are recorded in Table 1, together with the identification of the organosulfonimidate used as the monomer. Some of the polymers were analyzed using thermogravimetric analysis under a helium atmosphere and a temperature increase rate of 10° C./minute. The temperature in degrees centigrade at which a 10% weight loss, based on initial polymer weight, was observed is recorded in Table 1 under the heading "TGA Temp.".

TABLE 1

| Monomer | Catalyst[8] | Time (Hrs) | % Yield | $M_w$ | $M_n$ | $M_w/M_n$ | TGA |
|---|---|---|---|---|---|---|---|
| 8ab | AlCl$_3$ | 100 | 69 | 284.907 | 13,770 | 20.7 | ND |
| 8ab | AlCl$_3$ | 144 | 82 | 192,607 | 9,424 | 20.4 | 258 |
| 8ab | BF$_3$.Et$_2$O[1] | 144 | 62 | 478,816 | 52,526 | 9.1 | 272 |
| 8ab | KF/Crown[2] | 144 | 83 | 175,461 | 23,079 | 7.6 | ND |
| 8ab | LiOPh[3] | 144 | 46 | 286,443 | 17,998 | 15.9 | 276 |
| 8ab | TASF[4] | 144 | 58 | 374,937 | 33,246 | 11.3 | ND |
| 8ab | None | 144 | 39 | 481,123 | 34,535 | 12.9 | ND |
| 8ab | Sn(oct)$_2$[5] | 144 | 69 | 427,664 | 30,325 | 14.1 | ND |
| 8ab | WCl$_6$ | 144 | 97 | 196,815 | 7,403 | 26.6 | ND |
| 8bb[6] | None | 144 | 32 | 194.614 | 138.116 | 1.4 | ND |
|  |  |  |  | 14,110 | 12,242 | 1.2 | ND |
| 8bb[7] | KF/Crown[2] | 144 | 46–50 | 66.261 | 17,484 | 3.8 | ND |

Notes
[1]Boron trifluoride etherate
[2]A mixture of potassium fluoride and 18-crown-6 ether in 1:1 mole ratio
[3]Ph = Phenyl
[4]TASF = Tris(dimethylamino)trimethylsilyl sulfur difluoride
[5]Stannous octoate
[6]The molecular weight distribution was distinctly bimodal and was analyzed as two peaks.
[7]The molecular weight distribution was bimodal and analyzed as a single peak.
[8]The catalyst concentration for all polymerizations was 0.05 mole percent, based on monomer.

That which is claimed is:

1. A method for preparing a polyorganooxothiazene, said method comprising the sequential steps of:
    (1) heating an organosulfonimidate of the formula HN=S(O)(R$^{1*}$)OR$^4$ for a sufficient time to form the corresponding polyorganooxothiazene, and
    (2) isolating the resultant polyorganooxothiazene, where:
    R$^{1*}$ is selected from the group consisting of monovalent alkyl radicals, monovalent substituted alkyl radicals, and heterocyclic radicals wherein the hetero atom is selected from the group consisting of oxygen, sulfur and tertiary nitrogen and the acyclic sulfur atom of said sulfonimidate is bonded to a cyclic carbon atom of the heterocyclic radical or separated from the heterocyclic ring by at least one carbon atom or a combination of carbon and hetero atoms, with the proviso that the carbon atom bonded to sulfur is not a cyclic carbon atom of an aromatic hydrocarbon radical, and R$^4$ is selected from the group consisting of aryl radicals and fluorinated alkyl radicals.

2. A method according to claim 1 where $R^{1*}$ is selected from the group consisting of alkyl, halogenated alkyl, and aralkenyl radicals, and said sulfonimidate is heated at a temperature of from 90° to 120° C.

3. A method according to claim 1 where $R^{1*}$ is individually selected from the group consisting of alkyl radicals containing from one to twenty carbon atoms and beta-styryl radicals and $R^4$ is selected from the group consisting of 2,2,2-trifluoroethyl and phenyl radicals.

4. A method for preparing an oxothiazene copolymer comprising the sequential steps of (1) heating at least two organosulfonimidates of the formula $HN=S(O)(R^1)OR^4$ for a sufficient time to form the corresponding oxothiazene copolymer, and (2) isolating said copolymer, where $R^1$ of each organosulfonimidate is individually selected from the group consisting of monovalent unsubstituted and substituted hydrocarbon radicals and heterocyclic radicals wherein the hetero atom is selected from the group consisting of oxygen, sulfur and tertiary nitrogen, and the acyclic sulfur atom of said organosulfonimidate is bonded to a cyclic carbon atom of the heterocyclic radical or is separated from the heterocyclic ring by at least one carbon atom or a combination of carbon and hetero atoms; and $R^4$ of each organosulfonimidate is individually selected from the group consisting of aryl and fluorinated alkyl radicals.

* * * * *